United States Patent [19]
Tripathi et al.

[11] Patent Number: 6,161,157
[45] Date of Patent: Dec. 12, 2000

[54] DOCKING SYSTEM

[75] Inventors: Deepak Tripathi, Fort Collins, Colo.; Sung Soo Cho, Sunnyvale, Calif.

[73] Assignee: Intel Corporation, Santa Clara, Calif.

[21] Appl. No.: 09/179,508

[22] Filed: Oct. 27, 1998

[51] Int. Cl.$^7$ .................................................. G06F 13/00
[52] U.S. Cl. ...................... 710/109; 710/101; 710/103; 710/104
[58] Field of Search ................... 710/109, 107, 710/102, 103, 104, 105, 129, 126

[56] References Cited

U.S. PATENT DOCUMENTS

| | | | |
|---|---|---|---|
| 5,504,757 | 4/1996 | Cook et al. | 370/84 |
| 5,596,728 | 1/1997 | Belmont | 395/281 |
| 5,819,052 | 10/1998 | Sonoda | 395/293 |
| 5,953,511 | 9/1999 | Sescila, III et al. | 710/128 |
| 6,023,587 | 2/2000 | Watts, Jr. et al. | 395/892 |

OTHER PUBLICATIONS

Institute Of Electrical And Electronics Engineers, Inc., *P1394b Draft Standard For A High Performance Serial Bus* (Supplement), Draft 0.09, pp. 1–2, 7–32, 77–146 (Mar. 1998).

Texas Instruments, *Industry's First 1394 OHCI Link Layer Controller And A New Family of 400 Mb/s Physical Layer Devices are Announced by Texas Instruments*, pp. 1–3, printed from web site http://www.ti.com/sc/docs/news/1997/97074.html (1997).

Intel Corp., *1394 Technology,* pp. 1–4, printed from web site httm://developer.intel.com/technology/1394/html, dated at leaast as early as Aug. 13, 1998.

Whatis.com Inc., *FireWire (IEEE 1394)*, pp.1–2, printed from web sit http://whatis.com/firewire.html (1997).

Whatis.com Inc., *Isochronous,* p. 1, printed from web site http://whatis.com/isochron.html (1997).

*IEEE Standard for a High Performance Serial Bus,* pp. 37–43, 118, 144–145, 154–155, 216 (Aug. 30, 1996).

Compaq et al., *Device Bay Interface Specification,* Rev. 0.85, pp. 15–16, 19–20, 25, 112 (Feb. 6, 1998).

Bill Pearsen, *USB and 1394: Living Together In Harmony,* pp. 1–4, printed from web site http://developer.intel.com/solutions/archive/issue6/stories/harmony.html, dated at least as early as Mar. 28, 1998.

*Primary Examiner*—Glenn A. Auve
*Assistant Examiner*—X. Chung-Trans
*Attorney, Agent, or Firm*—Trop, Pruner & Hu, P.C.

[57] ABSTRACT

A system includes a portable computer having a first bus and a docking base having a second bus. A serial link (e.g., a 1394 link) couples the portable computer to the docking base. The portable computer may include a controller to convert a first bus cycle targeted for the second bus to a serial cycle. The first and second buses may each include a Peripheral Component Interconnect (PCI) bus.

29 Claims, 5 Drawing Sheets

DATA PACKET

| | |
|---|---|
| DWORD0 [31] | PACKET TYPE (1 = COMMAND, 0 = RESPONSE) |
| DWORD0 [30] | ADDRESS CYCLE TYPE (32 OR 64 BIT ADDR) |
| DWORD0 [29:26] | INTA#, INTB#, INTC#, INTD# |
| DWORD0 [25] | RST# |
| DWORD0 [24] | LOCK# |
| DWORD0 [23:22] | RESERVED |
| DWORD0 [21:12] | DATA LENGTH |
| DWORD0 [11:8] | C[3:0]# |
| DWORD0 [7:0] | BE[7:0]# |
| DWORD1 [31:0] | UPPER 32 BITS OF ADDRESS |
| DWORD2 [31:0] | LOWER 32 BITS OF ADDRESS |
| DWORD3-n [31:0] | DATA, 0 TO 4K BYTES |

DOCKING SYSTEM

BACKGROUND

The invention relates to docking systems.

As portable computers have become increasingly powerful, many users are now using portable computers as replacements for desktop computers. In the office or other location, portable computers may be docked to docking base units for convenient access to additional resources, including a network, a printer, mass storage devices such as hard disk drives, compact disc (CD) or digital video disc (DVD) drives, and other types of devices. By using a docking unit, such resources become available once the portable computer is docked.

Various types of docking solutions exist. One includes a docking connector that couples an expansion or secondary bus in the portable unit to a corresponding bus in the docking base unit. Another type of system includes docking connectors that couple a Peripheral Component Interconnect (PCI) bus, as described in the PCI Local Bus Specification, Production Version, Revision 2.1, published in June 1995, in the portable computer to a PCI bus in the docking base unit.

In many types of docking systems, dedicated docking pins, other than standard pins such as bus protocol signal pins may be needed. This increases the pin count in the docking connector. In addition, in many docking systems, there is no standard mechanism defined for live attachment or detachment of the portable computer to or from the docking base unit. Thus, depending on the location and number of dedicated docking pins in the docking connector and whether live attach and detach capabilities are implemented, different computer manufacturers may develop different docking mechanisms. As a result, a docking base unit is typically designed specifically for a particular portable or family of portable computers from one computer manufacturer due to the various incompatible docking solutions.

SUMMARY

In general, according to an embodiment, a first bus cycle on a first bus in a portable device coupled to a docking base over a docking link is converted to a docking link cycle that is different in format from the first bus cycle. The docking link cycle is transmitted to the docking base.

Other features will be apparent from the following description and from the claims.

DETAILED DESCRIPTION

Figure 1A:
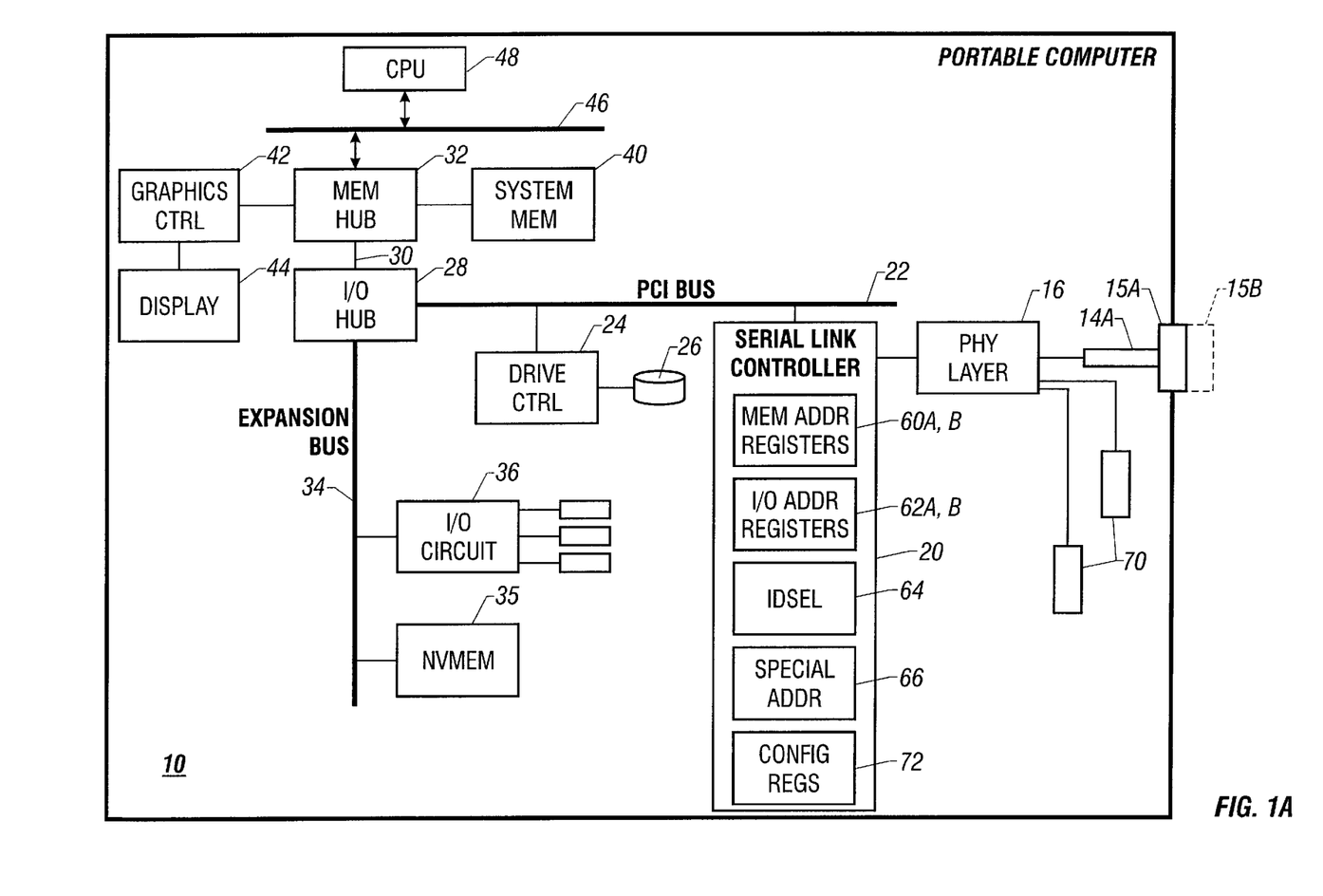
FIGS. 1A–1B are a block diagram of a docking system in an embodiment including a portable device and a docking base unit in accordance with the invention.
Figure 1B:
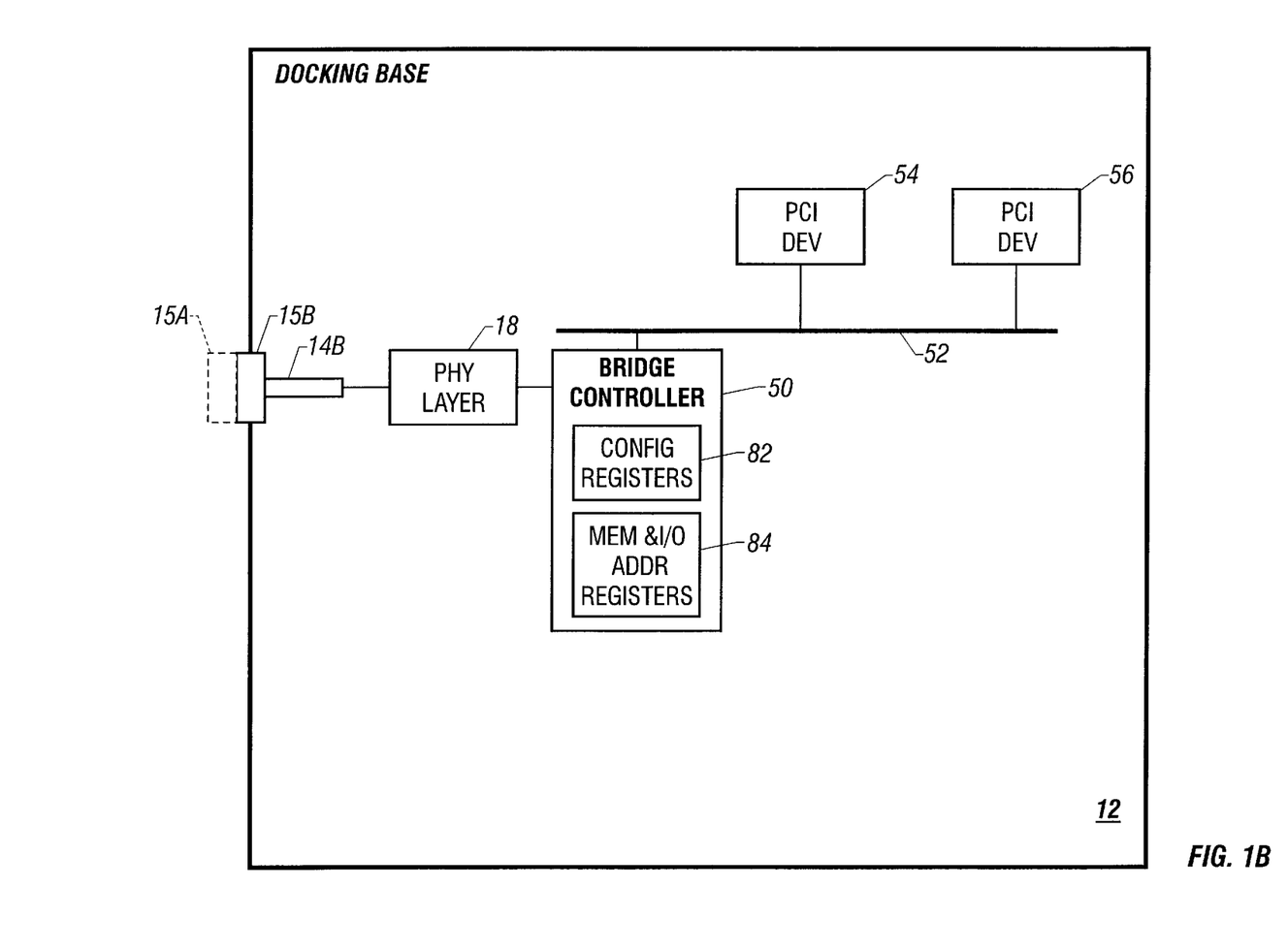

Referring to FIGS. 1A–1B, according to an embodiment of the invention, a system 10 (e.g., a general-purpose or special-purpose portable computer or other microprocessor or microcontroller based system) is docked to a docking base unit 12 through a port that couples a link 14A in the system 10 to a link 14B in the docking base unit 12. In the ensuing description, reference is made to an implementation with a portable computer although it is contemplated that other types of systems that are dockable to a docking base may also be used.

The portable computer 10 includes a docking port 15A that is coupled to a receiving port 15B on the docking base unit 12. In one embodiment, the links 14A, 14B (which may be collectively referred to as a link 14) may be serial links, although other types of links may be used, such as parallel port links, infrared links, radio wave or microwave links, multiplexed links, and the like. The ports 15A, 15B may be collectively referred to as a port 15 or docking port 15. In embodiments described below, a serial link 14 is used as an illustrative example for communication between the portable computer 10 and docking base 12 without limiting the invention.

The serial link 14 may be a high bandwidth serial bus that supports hot docking (i.e., one system may be attached to or detached from a docking base unit while the system remains powered on). In one example, the link 14 between the portable computer 10 and docking base unit 12 may be the 1394 serial link according to the IEEE 1394-1995 Standard, IEEE Standard For a High Performance Serial Bus, published Aug. 30, 1996, as supplemented by the IEEE 1394.b Specification, Draft 0.09, published Mar. 11, 1998.

For purposes of this application, the term "1394 specification" may refer to the IEEE 1394-1995 specification by itself or as it is supplemented by later revisions such as the IEEE 1394.b specification. Similarly, the term "1394 serial link" may refer to a serial link or bus defined by the IEEE 1394-1995 specification by itself or in combination with later revisions such as the IEEE 1394.b specification.

The 1394 serial link is a high bandwidth serial link capable of reducing the latency of communications between components in the portable computer and docking base unit. Pursuant to the 1394.b specification, the 1394 serial link is capable of offering at least 800 megabits per second of bandwidth, with peak bandwidths of up to 1.6 gigabits per second (Gb/s) or 3.2 Gb/s.

As illustrated in FIGS. 1A–1B, on either side of the high speed serial link 14 are physical layer chips 16 and 18 in the portable computer 10 and docking base unit 12, respectively, which form the physical interface between the serial link 14 and other components in the respective units. In the portable computer 10, a serial link controller 20 is coupled between the physical layer chip 16 and a system bus 22, which may be a PCI bus as defined in the PCI Local Bus Specification, Production Version, Revision 2.1, published in June, 1995. The bus 22 may alternatively be defined by other specifications. The serial link controller 20 may be compatible with the 1394 Open Host Controller Interface (OHCI) Specification, Revision 1.0, published in October 1997.

Cycles on the bus 22 may be generated by bus masters and targeted for specific addresses. For example, a bus cycle may include control, address, and data information. In response to a bus cycle, a target device may assert predefined handshake signals to indicate recognition of the cycle. For specific signals generated in bus cycles and responses, reference is made to the specific bus specifications.

Other components of the example portable computer 10 include a mass storage device controller 24 coupled to one or more storage devices 26, which may include one or more of the following: a hard disk drive, a compact disc (CD)

drive, or a digital video disc (DVD) drive. The bus 22 may further be coupled to an input/output (I/O) hub 28 that includes bridge controllers for the bus 22 as well as for an expansion or secondary bus 34. The expansion bus 34 may be coupled to an I/O circuit 36 that may include interface circuits for a serial port, parallel port, and floppy drive, as examples. A non-volatile memory 35 may also be coupled to the expansion bus 34.

The I/O hub 28 is coupled by a link 30 (which may be a serial link, for example) to a memory hub 32 that includes a memory controller coupled to system memory 40. The memory hub 32 may also include an Accelerated Graphics Port (A.G.P.) interface (described in Accelerated Graphics Port Interface Specification, Revision 2.0, published May 1990) coupled to a graphics controller 42 that may be coupled to a display 44. The memory hub 32 also includes circuitry for coupling to a host or front side bus 46. A central processing unit (CPU) 48 that forms the processing core of the portable computer 10 is coupled to the host bus 46.

Other configurations of the portable computer 10 are also possible. For example, instead of the memory and I/O hub architecture, a system using separate host and system bridge controllers (sometimes referred to as "north" and "south" bridges) may also be used in which the host bridge controller is coupled between the PCI bus and a processor bus and the system bridge controller is coupled between the PCI bus and the expansion bus. In further embodiments, additional modifications to the system may be possible.

In the docking base unit 12, the physical layer chip 18 is coupled to a bridge controller 50, which in turn may be coupled to a system bus 52 (which also may be a PCI bus or another type of bus). The bus 52 may be coupled to one or more devices 54 and 56. Cycles originating from a bus master on the bus 52 may be targeted for devices in the docking base unit 12 as well as for devices in the portable computer 10. For example, a response cycle for a device in the portable computer 10 may be generated by a docking base device in response to an earlier command bus cycle. The bridge controller 50 includes bridge circuitry to perform protocol translations between the bus 52 and the serial link 14 (e.g., a 1394 serial link). In one example, the bridge controller 50 may be a PCI-1394 bridge controller.

Thus, according to one embodiment of the invention, the docking link 14 between the portable computer 10 and the docking base unit 12 has a communications protocol or format that is different from the communications protocol or format of the buses 22 and 52 in the portable computer and docking base unit. In the example described, the docking link 14 is a serial link while the buses 22 and 52 are PCI buses.

One advantage of using a serial link such as a 1394 serial link is that modules may support live insertion, thus allowing hot docking and undocking of the portable computer 10 to and from the docking base unit 12. In addition, by using a predefined link for docking the portable computer 10 to the docking base unit 12, a standard docking mechanism may be used for different types of systems. Thus, for example, this may allow one docking base unit to be used with portable computers of different types and from different manufacturers.

In one embodiment of the invention, PCI cycles are transported over the serial link 14 between the portable computer 10 and the docking base unit 12 in packets. For purposes of the following description, the serial link 14 is assumed to be a 1394 serial link and the buses 22 and 52 are assumed to be PCI buses. However, it is contemplated that other types of serial links and buses may also be used.

PCI cycles originating in the portable computer 10 are transported by the serial link controller 20 in the payload section of a 1394 packet over to the docking base unit 12. In the docking base unit 12, the bridge controller 50 (which may be a PCI-1394 bridge) receives the 1394 packet and reproduces the PCI cycle on the docking base unit's PCI bus 52. All the information needed to reproduce the PCI cycle on the PCI bus 52 in the docking base unit (including the address, command, byte enables, data, and other control signals) are encoded in a special "PCI cycle" packet for transmission over the 1394 serial link 14. The PCI cycle information is inserted into the payload section of a 1394 packet and transported over the serial link 14.

According to the 1394 specification, the packet may be either an asynchronous packet or an isochronous type, as dictated by the particular implementation. Asynchronous transfers are data flows that are initiated independently of each other, whereas isochronous transfers are data flows that are transmitted at a preset rate for time coordination (which is useful for video and audio transmissions, for example). Thus, isochronous transfers occur at a steady rate whose timing is according to the ability of the receiving device to process received data.

To reproduce the PCI cycle, the bridge controller 50 in the docking base unit 12 strips off the 1394 header and any CRC (cyclic redundancy check) fields. A response from the docking base unit is encoded into a 1394 packet by the bridge controller 50 and transported over the serial link 14 in similar fashion. The serial link controller 20 receives the packet and reproduces the PCI cycle on the PCI bus 22. A PCI cycle packet may be a PCI command packet (a packet created when a transaction from a PCI bus master is detected on PCI bus 22 or 52 that is targeted for a device over the serial link 14) or a PCI response packet (a packet created when a PCI device responds to the PCI command cycle transmitted in a PCI command packet).

Figure 2:
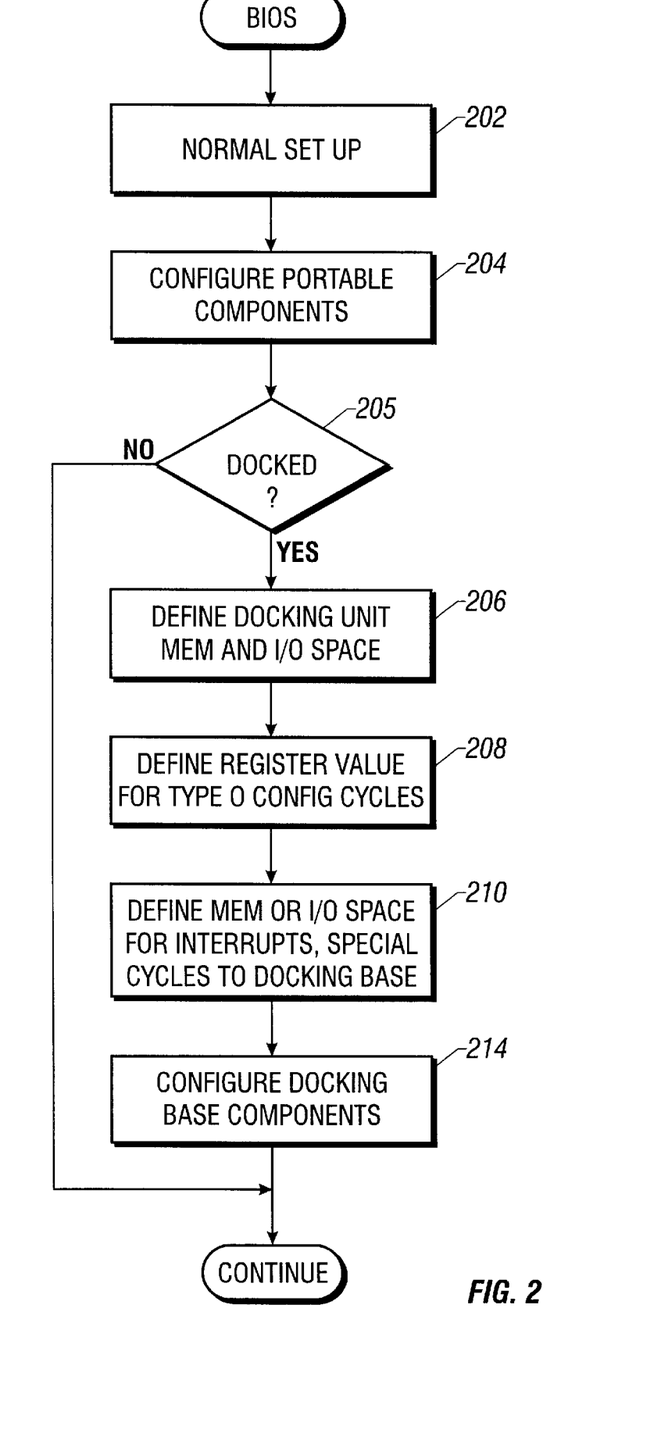
FIG. 2 is a flow diagram of a basic input/output system (BIOS) routine according to an embodiment to set up the docking system of FIGS. 1A–1B.

Referring to FIG. 2, a flow diagram is shown of one embodiment of a basic input/output system (BIOS) routine that is initially stored in the non-volatile memory 35 and which may be copied to the system memory 40 for execution by the CPU 48 in accordance with the invention. During the power-on sequence or during system reset, the BIOS may be in charge of initializing and setting up the computer system including the portable computer 10 and docking base unit 12. One of the functions of the BIOS is to define the memory and I/O address space of components in the system as well as to configure components in the system.

After performing various standard initialization tasks (at 202), the BIOS routine configures (at 204) each of the components in the portable computer 10. This may be performed, for example, by setting up configuration tables that are accessible by the operating system after boot-up. The BIOS routine then checks (at 205) to determine if the portable computer 10 is docked to the docking base unit 12. When the portable computer 10 is docked to the serial port 15, the serial link controller 20 detects this docked state and provides an indication of the docked state (e.g., by setting an internal register bit or writing to a predetermined memory or I/O location in the portable computer 10).

If the portable computer 10 is not docked, then the BIOS routine may continue with other standard setup functions; however, if docked, specific configuration tasks are performed by the BIOS routine to properly set up communication over the serial link 14. In one embodiment, the BIOS routine assigns (at 206) devices (including PCI devices 54 and 56 and the bridge controller 50) in the docking base unit 12 to predefined address windows in both memory and I/O address space. In one example configuration, the components of the docking base unit 12 may be assigned to a contiguous memory address space and a contiguous I/O space. This facilitates recognition by the serial link controller 20 in the portable computer 10 of transactions targeted for the docking base unit 12. Any such PCI transactions are then repackaged by the serial link controller in the payload section of the 1394 packet.

Alternatively, the repackaging could be performed by a serial port device driver in response to a request from the operating system (OS) that is targeted to a device in the docking base unit 12. Based on configuration information set up by the BIOS, the OS is aware of the memory and I/O address space of the docking base unit 12. Thus, a command or request from the OS having an address in the docking base unit's address space may be converted into a 1394 packet and written to the serial link controller 20 by the serial port device driver.

To define the memory and I/O address space of devices in the docking base unit 12, registers may be included in the serial link controller 20. Alternatively, predefined address locations outside the serial link controller 20 may be used to store such information, such as the system memory 40. If address space assignment in the docking base unit 12 is contiguous, then two registers 60A, B in the serial link controller 20 may be used to define the starting and ending address of the memory address window, and two registers 62A, B may be used to define the starting and ending addresses of the I/O address window assigned to devices in the docking base unit 12. In one example, if 32-bit PCI buses are used, then the registers 60 and 62 used to define the upper and lower bounds of the memory and I/O address windows may each be 32 bits wide. Thus, memory or I/O accesses over the PCI bus 22 received by the serial link controller 20 may be forwarded to the serial link 14 based on a comparison of the transaction address with the docking unit memory and I/O boundary addresses stored in the serial link controller 20.

The serial link controller 20 may also capable of re-directing configuration cycles (e.g., type 0 configuration cycles) on the PCI bus 22 to the PCI bus 52 in the docking base unit 12. To do so, in one embodiment, the BIOS routine writes (at 208) a value to a register 64 that reflects the position of initialization device select (IDSEL) bits associated with PCI devices in the docking base unit 12. According to the PCI specification, the upper 21 address bits AD[31:11] may be used to store the IDSEL bits for PCI devices during configuration cycles. Thus, by activating one of the AD[31:11] signals at a time, different devices may be uniquely selected for configuration accesses. Thus, the register 64 used to store the IDSEL values in one embodiment may be a 21-bit register that contains a value indicating which of the PCI devices are in the docking base unit 12. Thus, for example, if a type 0 configuration transaction is received by the serial link controller 20 that is targeted to a PCI device in the docking base unit 12 based on a comparison of the IDSEL bits of the configuration transaction with the value stored in the IDSEL register, the bridge controller 20 repackages the configuration transaction in the payload portion of the 1394 PCI cycle packet. The bridge controller 20 then forwards the packet to the bridge controller 50 in a docking base unit 12. In response to receipt of this packet, the bridge controller 50 in the docking base unit 12 generates a type 0 configuration transaction on the PCI bus 52 to configure one of the PCI devices in the system, including PCI devices 54, 56 and the bridge controller 50 itself. After setting up the value of the IDSEL register 64 in the serial link controller 20, the BIOS routine is then able to generate configuration transactions targeted at PCI devices in the docking base unit 12 to configure those devices.

Next, the BIOS routine performs (at 210) the configuration needed to handle interrupts, interrupt acknowledge cycles, and special cycles generated in the portable computer 10 or docking base unit 12. These types of cycles are not associated with particular memory or I/O addresses. As a result, an interrupt acknowledge or special cycle generated in the portable computer and targeted to the docking base unit 12 is handled differently from memory, I/O, or configuration cycles.

As specified in the PCI specification, special cycles do not cross PCI-PCI bridges. Also, according to the PCI specification, an interrupt acknowledge cycle has no addressing mechanism and is implicitly targeted to the interrupt controller, whether it be located in the portable computer 10 or docking base unit 12. Similarly, an interrupt from a device in either the docking base unit 12 or the portable computer 12 is not associated with an address.

To handle such transactions, the BIOS routines may define predefined memory or I/O addresses (which may be stored in one or more registers 66, for example) during configuration. Thus, for example, special cycles generated in the portable computer 10 and targeted to the docking base unit 12 may be assigned a range of memory or I/O addresses (referred to as special cycle address) such that a memory or I/O transaction having one of those particular addresses is packaged differently by the serial link controller 20. For example, when the serial link controller 20 detects a transaction having a special cycle address, the serial link controller 20 converts the received PCI memory or I/O transaction into a special cycle that is stored in the payload section of the serial link packet. Once the bridge controller 50 receives this special package in the docking base unit 12, it regenerates the special cycle on the PCI bus 52. Examples of special cycles include shutdown, flush, halt, flush acknowledge, stop grant acknowledge, and system management interrupt (SMI) acknowledge cycles that are recognized by processors from Intel. Interrupts and interrupt acknowledge cycles are treated in similar fashion.

Next, the BIOS routine configures (at 214) components in the portable computer 10 and docking base unit 12 by, for example, issuing type 0 configuration transactions on the PCI bus 22. As explained above, type 0 configuration transactions targeted for devices in the docking base unit 12 (as determined from the IDSEL register 64) are re-directed by the serial link controller 20 to the bridge controller 50. As part of the configuration cycle, the BIOS routine programs registers 84 in the bridge controller 50 with the memory and I/O address boundaries of devices in the portable computer 10.

Figure 3:
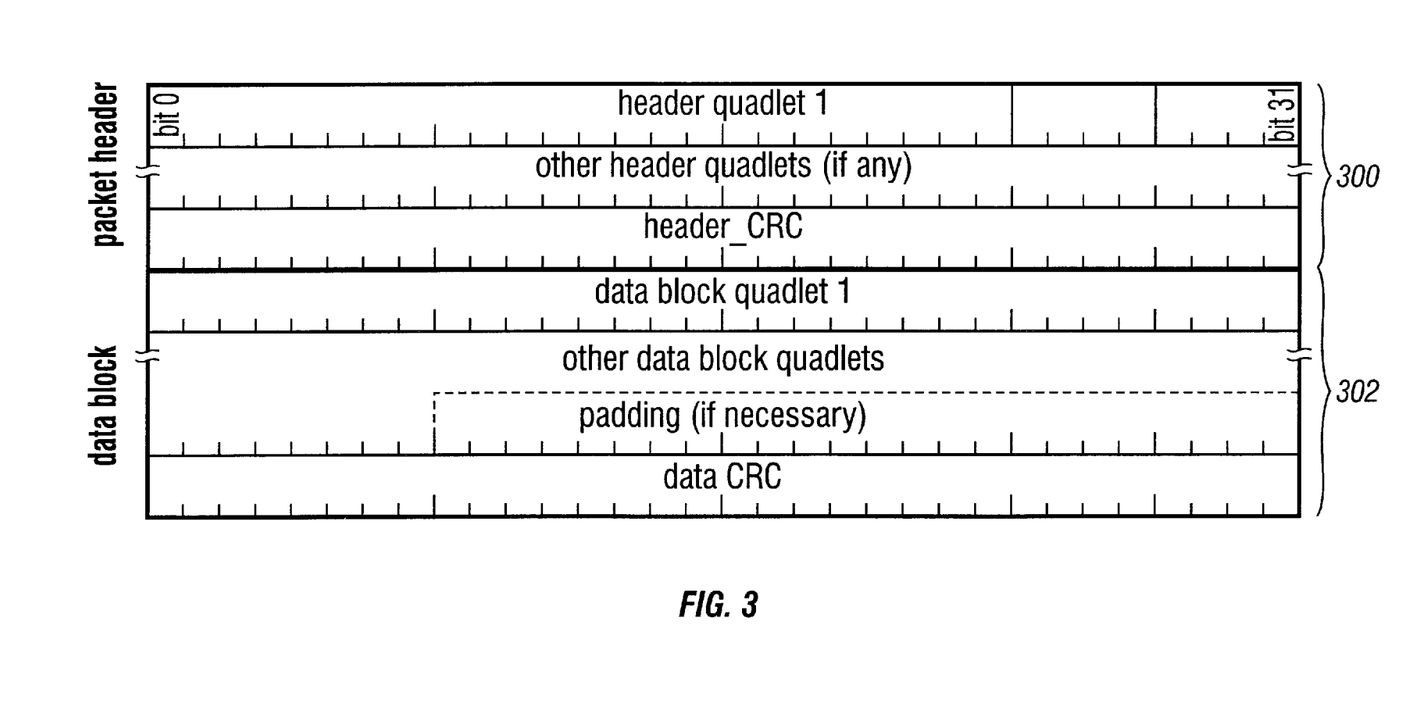
FIGS. 3 and 4 are diagrams of portions of a serial link packet according to an embodiment transmitted between the portable device and docking base unit.

There are two types of packets that may be transferred over the 1394 serial link 14: an asynchronous packet and an isochronous packet. As illustrated in FIG. 3, each type of packet may include a packet header portion 300 and a data packet portion 302 (the payload section). Signals associated with a PCI transaction are stored in the payload section 302 of the serial bus packet. Examples of the contents of the payload section 302 may include the following PCI signals: command signals C[3:0]#; byte enable signals BE[7:0]#; address bits A[63:0]; data bits D[63:0]; interrupt signals INTA#, INTB#, INTC#, INTD#; a reset signal RST#; and a lock signal LOCK#. In addition, a multi-bit data length indication LEN may be used to indicate how many data quadlets are in a write cycle or read response cycle. A quadlet is a 32-bit word. Another signal that may be transported along in the data packet portions 302 is the address cycle type signal (ATYP) to indicate whether 32-bit or 64-bit addressing is being used.

Figure 4:
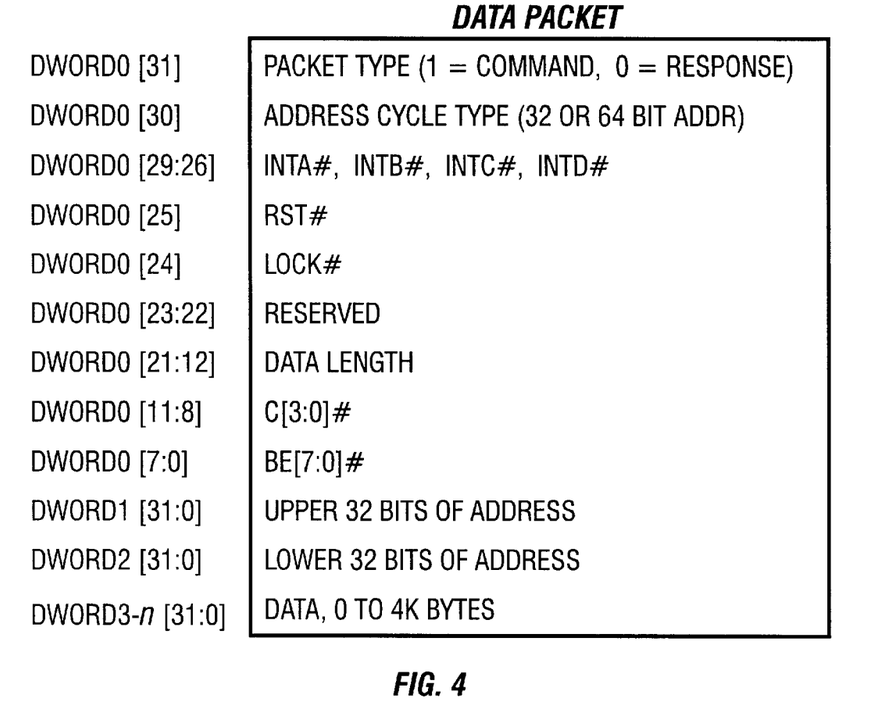

The format of the data packet portion 302 in a PCI cycle serial packet may be organized as in FIG. 4. The first three data words DWORD0, DWORD1, DWORD2 are used to store the address bits, control bits, and status bits of the PCI cycle. The rest of the data packet portion 302, which may include data words DWORD3 to DWORDN, are used to store the quadlets of data in a write cycle or a read response transaction.

In the illustrated embodiment, the bit DWORD0[31] indicates the packet type, whether it is a command or a response. The bit DWORD0[30] indicates the address cycle type (ATYP), whether 32- or 64-bit addressing is used. Bits DWORD0[29:26] may be used to store the interrupt signals INTA#, INTB#, INTC#, and INTD#. Bits DWORD0[25:24] are used to store the reset and lock signals RST# and LOCK#, respectively. Bits DWORD0[21:12] may be used to indicate the data length. Bits DWORD0[11:8] may store the command bits C[3:0]#, and bits DWORD0[7:0] may store the byte enable bits BE[7:0]#. The upper 32 bits of the address are stored in DWORD1[31:0]. For 32-bit addressing, these bits may be set to all zeros. The lower 32 bits of the address are stored in DWORD2[31:0].

In one embodiment, only one set of data bytes BE[7:0]# are stored for each transaction. Thus, for transactions that involve more than 8 data bytes, each byte enable bit BE[i]# is re-used to cover all corresponding data bytes; that is, BE[i]# covers data bytes [i, i+8, i+16, . . . ]. Since the header and data block portions 300 and 302 of the serial link packet are protected by CRC, the PCI parity bits do not need to be included as separate fields in the PCI cycle packet. The PCI parity bits may be regenerated by the controller (20 or 50) on the receiving side.

Alternatively, for an implementation in which only 32-bit PCI addressing is used, the PCI data packet format may be simplified since only 32 bits of address and 32 bits of data are transmitted for all cycle types.

In one embodiment, the serial link controller 20 is coupled only to the docking base unit 12 through the PHY layer chip 16 and serial link 14. In such an embodiment, since the serial link controller 20 is dedicated to the docking port 15, the data transfer rate may be maximized since the serial link bandwidth is not shared with other devices.

However, in other embodiments, other devices may be coupled to the serial link controller 20 through one or more ports 70. As examples, devices that may be coupled to the ports 70 include a printer, pointer device, a keyboard, a digital camera, a modem, a speaker, a scanner, a DVD player, a video display, or an audio output device. In such embodiments, the serial link controller 20 may need to arbitrate among requests from the different serial ports 70 and 15.

As noted above, the 1394 specification supports asynchronous and isochronous data transfers. Each of the ports 15 and 70 may be configured at boot time to support either transfer mode. Thus, the serial link controller 20 and bridge controller 50 may contain configuration registers 72 and 82 that are programmed during reset (or in response to a dock event) to specify the transfer mode, including asynchronous transfer mode or isochronous transfer mode. Asynchronous transfers are data flows that are initiated independently of each other, whereas isochronous transfers are data flows that are transmitted at a preset rate for time coordination (which is useful for video and audio transmissions, for example). Thus, isochronous transfers occur at a steady rate whose timing is according to the ability of the receiving device to process received data.

In the 1394 specification, a predetermined total cycle window is defined in which time slots or channels may be provided to service isochronous requests from different devices. In addition, a portion of the cycle time may be dedicated to asynchronous transfers. Thus, in one example, a 125-µs total cycle window may be defined in which a first portion ("the isochronous transfer window") is reserved for isochronous transfers and the remaining portion ("the asynchronous transfer window") is reserved for asynchronous transfers.

Thus, if the docking link 14 is configured as a asynchronous transfer link, then the PCI cycle packets are transferable only during the asynchronous transfer window. To ensure that a PCI command packet is transferred within an acceptable latency (e.g., the latency associated with a typical PCI—PCI bridge), the percentage of the total cycle window allocated for the asynchronous transfer window must be sufficiently large. In addition, the PCI cycle request may need to be assigned the highest priority over other asynchronous requests. If the ports 70 are all defined as having asynchronous links, then the entire total cycle window may be assigned to asynchronous transfers.

As an example, if a PCI access includes 32-bit address and data, then an asynchronous PCI cycle packet may be nine quadlets long, with four quadlets used for the PCI command (control, address, and data signals) and five quadlets used for the 1394 packet header and CRC fields. If a transfer rate of 1.6 Gb/s is available over the serial link 14, then a 180-ns or 6 PCI clock latency (assuming 33 MHz PCI clock) is added to serially transfer a PCI cycle packet over the serial link 14. This added latency is in addition to the latency associated with the division of asynchronous and isochronous transfers described above.

In another embodiment, the serial link 14 between the portable computer 10 and docking base unit 14 may be configured as an isochronous link. An isochronous PCI cycle packet may include four quadlets for the PCI command, as in the example above, but only three quadlets may be needed for the header and CRC fields. Thus, for isochronous transfers at 1.6 Gb/s, the added latency is about 140 ns, or 5 PCI clocks, to serially transfer a PCI cycle packet over the serial link 14.

To handle isochronous transfers, the serial link controller 20 may include a first-in-first-out (FIFO) queue to store incoming isochronous requests. The PCI cycle packet is assigned to a predetermined isochronous channel during which PCI cycle packets may be transferred in the isochronous transfer window. Thus, the worst case latency associated with the transfer of an isochronous PCI cycle packet may range between a time period equal to the asynchronous transfer time window (to allow asynchronous transfers to occur) and a time period equal to the total cycle time window (which may occur if a PCI packet request is received right after an isochronous stream in the PCI packet channel has already started). To alleviate the worst case latency, dynamic concatenation may be performed in which a PCI cycle packet may be added to an isochronous stream already in progress. Alternatively, the serial link controller 20 may "leap-frog" or jump PCI cycle packets over other queued isochronous requests to ensure transmission of the isochronous PCI cycle packet at the earliest time possible.

In either an asynchronous or isochronous packet, the serial link controller 20 may specify a particular destination address of the bridge controller 50 in the docking base unit 12. With an asynchronous packet, the specified destination address according to the 1394 specification may be a 48-bit physical address. For an isochronous packet, the destination address may be 6-bit channel ID specifying the channel in the isochronous transfer window during which PCI cycle packets are transmitted.

Figure 5:
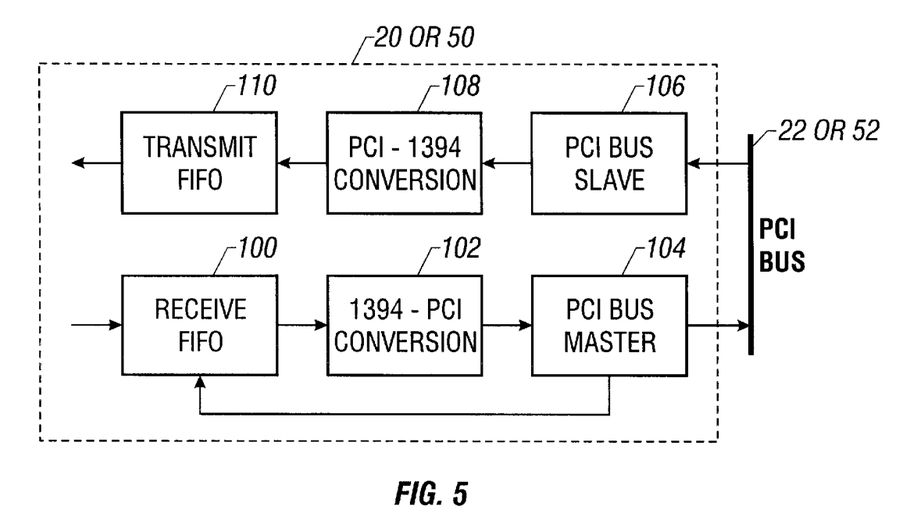
FIG. 5 is a block diagram of logic in a bridge controller in the docking system of FIGS. 1A–1B.

Referring to FIG. 5, logic according to one embodiment to implement the PCI-to-1394 and 1394-to-PCI translations as may be used in either the serial link controller 20 or bridge controller 50 is illustrated. PCI transactions on the PCI bus 22 or 52 targeted for the serial link 14 are decoded by the PCI bus slave 106 and forwarded to a conversion block 108 to package as a 1394 PCI cycle packet. PCI cycle packets are stored in a transmit FIFO 110 for transmission to the serial link 14 through the PHY layer 16 or 18.

Packets transmitted over the serial link 14 are received in a receive FIFO 100, with each packet converted by a conversion block 102 to a PCI format by removing the 1394 header and CRC fields. The PCI command or response information is then sent to a PCI bus master 104, which generates a PCI cycle on the bus 22 or 52. As parity bits are not included in the PCI cycle packet, the PCI bus master regenerates the PCI parity bits from the received address and data.

In one embodiment, the corresponding entry in the receive FIFO 100 is not cleared until a device on the PCI bus 22 or 52 has claimed the PCI cycle generated by the PCI bus master 104. Similarly, an entry in the transmit FIFO 110 is not cleared until the 1394 packet has been transmitted over the serial link 14.

Other embodiments are also within the scope of the following claims. For example, links other than a serial link may be used for communication between the docking base and the portable computer—for example, possible alternative links include a parallel link, an infrared link, radio wave or microwave links, multiplexed links, and so forth. Also, the portable computer and docking base unit may include other types of buses besides PCI buses.

Thus, by using a predefined link (such as a serial link) to couple a system to a docking base unit, a docking base may be designed to accommodate different types of systems from different manufacturers. Further, certain types of links such as the one listed above have reduced connector pin counts in relation to conventional docking connectors used to directly couple buses in systems and docking bases.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
a portable device having a first bus;
a docking base having a second bus; and
a docking link adapted to couple the portable device to the docking base,
the portable device including a controller adapted to generate a configuration cycle on the first bus and an interface to convert the configuration cycle targeted for the second bus to a different cycle transferable over the docking link,
the docking base having an interface to convert the different cycle to a configuration cycle on the second bus.

2. The system of claim 1, wherein the docking link includes a serial link.

3. The system of claim 2, wherein the different cycle includes a serial packet, and wherein the configuration cycle includes predefined bus cycle information being carried in the serial packet.

4. The system of claim 3, wherein the serial packet includes a header portion and a data portion, the bus cycle information being carried in the data portion of the serial packet.

5. The system of claim 1, wherein the first bus and second bus each includes a Peripheral Component Interconnect bus.

6. The system of claim 1, wherein the docking link includes a 1394 serial link.

7. The system of claim 1, wherein the docking base includes a device having a predetermined address, the controller adapted to convert the configuration cycle having the predetermined address into the docking link cycle.

8. The system of claim 1, wherein the docking base includes a device having a predetermined configuration space, the controller adapted to convert the configuration cycle in the predetermined configuration space to the docking link cycle.

9. The system of claim 1, wherein the docking link supports asynchronous data transfers.

10. The system of claim 1, wherein the docking link supports isochronous data transfers.

11. A method of communication in a system having a portable system coupled to a docking base over a docking link, comprising:
converting a first bus special cycle without an associated address on a first bus in the portable system to a docking link cycle that is different in format from the first bus cycle; and
transmitting the docking link cycle containing a special cycle address to the docking base.

12. The method of claim 11, further comprising:
converting the docking link cycle to a second bus special cycle in the docking base; and
producing the second bus special cycle without an associated address on a second bus in the docking base.

13. The method of claim 12, wherein the first and second bus cycles have the same format.

14. The method of claim 11, wherein converting includes converting the first bus cycle to a serial link cycle.

15. The method of claim 11, wherein the first bus special cycle is converted to the docking link cycle by adding first bus special cycle information in a data portion of the docking link cycle.

16. The method of claim 15, further comprising converting the docking link cycle to a second bus special cycle in the docking base by decoding the special cycle address in the docking link cycle and extracting the first bus special cycle information from the data portion of the docking link cycle.

17. The method of claim 11, further comprising transmitting the docking link cycle through a serial link coupling the portable system and docking base.

18. The method of claim 11, further comprising configuring the portable system to recognize first bus special cycles targeted for the docking base.

19. The method of claim 11, further comprising defining one or more special cycle addresses corresponding to one or more first bus special cycles.

20. The method of claim 19, further comprising adding one of the special cycle addresses to the docking link cycle.

21. A portable system capable of being docked to a docking base, comprising:

a first bus;

a link coupled to the first bus and capable of communicating with the docking base; and a controller to determine if a cycle on the first bus is a special cycle without an associated address, the controller converting the special cycle into a second cycle of a different format for communicating over the link, the controller adding a special cycle address into the second cycle.

22. The portable system of claim 21, wherein the controller is able to determine if the cycle on the first bus is a Peripheral Component Interconnect special cycle.

23. The portable system of claim 21, wherein the controller is able to determine if the cycle on the first bus is an interrupt cycle.

24. The portable system of claim 21, wherein the first bus comprises a Peripheral Component Interconnect bus.

25. The portable system of claim 21, wherein the link comprises a serial link.

26. A portable system capable of docking to a docking base, comprising:

a docking port;

a second port;

a bus; and an interface controller to convert a bus cycle targeted to the docking base to a different cycle transferable through the docking port, the interface controller to arbitrate between requests for the docking port and the second port.

27. The portable system of claim 26, wherein the interface controller comprises a serial interface controller.

28. The portable system of claim 27, wherein each of the docking and second ports are 1394 serial ports.

29. A docking base capable of docking a portable system, comprising:

a bus;

a docking port;

an interface coupled to the docking port, the interface to receive a first cycle from the docking port and to decode an address in the first cycle to determine if the first cycle carries a special cycle, the interface to generate the special cycle on the bus, the special cycle not associated with an address and having a format different from the first cycle.

* * * * *